(12) United States Patent
Lau et al.

(10) Patent No.: US 7,245,919 B2
(45) Date of Patent: Jul. 17, 2007

(54) PARALLEL MULTIPLE MEASUREMENT MESSAGE HANDLING FOR SOFT HANDOFF IN CDMA SYSTEMS

(75) Inventors: Kin Nang Lau, Parsippany, NJ (US);
Ali Masoomzadeh-Fard, Marlboro, NJ (US); Martin H. Meyers, Montclair, NJ (US); Alexandro Salvarani, Edison, NJ (US); Susan Wu Sanders, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 660 days.

(21) Appl. No.: 10/465,215

(22) Filed: Jun. 19, 2003

(65) Prior Publication Data

US 2004/0259547 A1 Dec. 23, 2004

(51) Int. Cl.
*H04Q 7/20* (2006.01)
(52) U.S. Cl. ............... 455/450; 455/453; 455/436; 455/433; 455/509; 455/553
(58) Field of Classification Search ........... 455/553, 455/436, 439, 433, 525, 449, 437, 438, 440, 455/443, 444, 513
See application file for complete search history.

(56) References Cited

U.S. PATENT DOCUMENTS

| 6,134,443 | A | * | 10/2000 | Spann et al. | 455/450 |
| 6,807,426 | B2 | * | 10/2004 | Pankaj | 455/453 |
| 2002/0045448 | A1 | * | 4/2002 | Park et al. | 455/436 |

* cited by examiner

*Primary Examiner*—Creighton Smith

(57) ABSTRACT

A method of processing, in parallel fashion, messages from a User Equipment (UE) in soft handoff with a plurality of base stations of a wireless communication system. Measurement Messages from the User Equipment are received and stored in a message buffer for a defined period of time. Later arriving messages replace previous messages during the defined period of time. When the defined period of time elapses, the latest stored message is processed in parallel fashion in a processing pipeline with other messages for the UE and other UEs. The latest message is processed by first converting it to soft handoff actions and inserting such actions into a processing pipeline. A conflict table is generated during the parallel processing of the soft handoff actions to avoid the processing of messages that conflict with each other. Conflicting messages are put into a pending state and remain in such state until they are canceled by subsequent messages or the conflict no longer exists.

18 Claims, 3 Drawing Sheets

PARALLEL MULTIPLE MEASUREMENT MESSAGE HANDLING FOR SOFT HANDOFF IN CDMA SYSTEMS

FIELD OF THE INVENTION

The invention relates generally to wireless communications. More particularly, the invention relates to handoff control in a wireless communication system.

BACKGROUND OF THE INVENTION

Wireless communication systems typically include a plurality of base stations where one or more base stations serve a geographic area commonly referred to as a cell. Users of the wireless communication system use their user equipment (UE) to communicate with each other and/or with the communication system. The communication system operates in accordance with established rules promulgated by governmental and industry groups; these rules are established as standards with which wireless communication systems comply. The standards contain various protocols that dictate the operation of the wireless communication systems. A protocol is a set of rules in accordance with communication within a communication system is to be initiated, maintained and terminated. The equipment at the base stations are referred to as system equipment. In wireless communication systems, communication can occur between two UEs (e.g., two cell phones or mobiles, wireless computer) or between a UE and system equipment.

A UE located in a particular cell being served by a base station communicates with other UEs or with other communication systems via the base station. The signals from the UE are transmitted to a receiving UE or to another communication system via the base station of the cell within which the UE is located. As a UE moves through cells being served by different base stations, communication from the UE is handled by the different base stations. Communication for a UE moving from one cell to another cell is transferred from one base station to another base station of the cell. The process in which communication for a UE is transferred from one base station (i.e., original base station) to another base station (i.e., target base station) is known as "handoff." A UE located at the edge of a serving cell and near a target cell will request a handoff to the target cell depending on the relative strength of communication signals of neighboring base stations. In many wireless communication systems, the base stations transmit pilot signals periodically and such pilot signals are received by the UEs which measure the strength of these pilot signals. A UE will request a handoff to one or more base stations based on the relative measured strengths of the pilot signals of the base stations.

One particular type of handoff used in many wireless communication systems such as CDMA (Code Division Multiple Access) systems is a soft handoff. In a soft handoff, communication with the target base station is established before communication with the original base station is terminated. Also during the soft handoff, the UE is in simultaneous communication with more than one base station. In this manner, no interruption of communication to and from the UE occurs. Eventually, when the process of soft handoff has ended, the UE communicates with another UE or another communication system via the target base station.

A soft handoff in CDMA systems occurs based on the pilot signal strength of several sets of base stations as measured by the UE. These sets are known respectively as the active set, the neighbor set, the candidate set and the remaining set. The active set is the set of base stations through which active communication is established. The neighbor set is a set of base stations surrounding the active base stations and includes base stations that have a high probability of having a pilot signal strength of sufficient level to establish communication, but through which active communication is not yet established. The remaining set is a set of base stations that are not included in any of the other three sets. Typically, the active set members have the higher measured pilot signals strengths relative to the other sets. The UE uses these sets to control the handoff process. When communications are initially established, a UE communicates through a first base station which is included in the active set.

During handoff however, the active set contains more than one base station. The UE monitors the pilot signal strength of the base stations in the active set, the candidate set, the neighbor set and the remaining set. During handoff when a pilot signal strength of a base station in the neighbor or remaining set reaches a defined threshold level, that base station is added to the candidate set and removed from the neighbor or remaining set by the UE. When the UE detects a relatively strong candidate pilot, the UE transmits a "Pilot Strength Measurement Message" (PSMM) (also known as a 'UE Measurement Report') to a Radio Network Controller (RNC) along with a request to add the base station of that pilot signal to the UE's active set. The UE Measurement Report is evaluated by the RNC which coordinates the processing of a soft handoff with the base stations associated with the strong detected pilot signals.

The RNC comprises radio and processing equipment that are able to communicate with the base stations and the UE. The RNC equipment are typically located at a Message Switching Center (MSC) of the wireless communication system. The UE Measurement report contains the measured pilot strength for a base station that the UE is requesting to be included in its active set. The RNC will determine if the base station, which the UE wants to be included in the UE's active set, has the requisite resources to serve the UE. If the base station requested by the UE has been determined by the RNC to have the requisite resources (e.g., transmit power, bandwidth, data rate) the RNC sends a message to the UE informing the UE that the base station requested by the UE can be added to the UE's active set. The UE sends a confirmation message back to the RNC confirming that the UE's active set has been updated and communication with the base station just added to the active set can commence. Thus, during handoff, the UE is in simultaneous communication—via a communication link comprising one or more communication channels—with the active set members. The communication link between a UE and a base station is often referred to as a leg. Eventually, the handoff process transfers communication to one of the base stations in the active set. The UE Measurement Report and other messages conveyed between a UE and a RNC and between a base station and a RNC during a handoff procedure or immediately prior to handoff are messages associated with a handoff or soft handoff.

In practice it is common for UE Measurement Reports messages to occur in bursts, particularly at the edges of areas of cell coverage where there are multiple strong candidates detected by the UE. The RNC, which processes the UE Measurement Reports during soft handoffs, typically handles the UE Measurement Reports in the order received, without preference, and does not process a subsequent UE Measurement Report message while processing a previous message. For example, when a UE detects two strong candidate pilots B and C at slightly different times, the UE transmits two separate UE Measurement Reports to the RNC. While the first UE Measurement Report is being processed, the second UE Measurement Report cannot be processed. Furthermore, in the instance where the second UE Measurement Report is related to a stronger more preferable signal, the processing delay caused by the controller having to process the first UE Measurement Report before the second UE Measurement Report, can result in dropped calls. Further the end to end latency in the process of adding or dropping multiple legs can result in excessive transmit power from the base stations, reduced system capacity and relatively high error rate.

FIG. 1 is a time diagram that depicts conventional processing of messages by a RNC during soft handoff for a CDMA (Code Division Multiple Access) wireless communication system. In particular, FIG. 1 depicts the timing of the flow of messages between an RNC, two base stations (B, C) and a UE. As is depicted therein, a first detected pilot signal for a first base station B results in a UE Measurement Report 102, transmitted to the RNC by the UE. A second detected pilot signal for a second base station C results in a second UE Measurement Report 104 transmitted to the RNC by the UE. In this example, the UE is requesting that base stations B and C be added to its active set meaning that a leg between it and base station B and another leg between it and base station C be added. Once received, each of UE Measurement Reports 102 and 104 is processed separately by the RNC.

The RNC's processing of the first UE Measurement Report 102 is as follows. In response to the first UE Measurement Report 102, the RNC sends a setup request message 106 to base station B. The setup request message is a request from the RNC to base station B asking base station B whether it has the requisite resources to establish a leg between it and the UE. Base station B responds by sending a setup response message 108 to the RNC. The setup response message from B may be a confirmation from B that it is able to establish a leg between it and the UE and has done so. The setup response message from B may also be that it does not have the requisite resources to set up a leg; if so, base station B will not become part of the UE's active set. However, when base station B is able to confirm its ability to establish a leg between it and the requesting UE and informs the RNC via the setup response 108, an active set update message 110 is transmitted to the UE by the RNC. The Active Set Update message 110 is an authorization from the RNC authorizing the requesting UE to add base station B to its active set. The UE adds base station B to its active set and then sends an active set update complete message 109 to the RNC informing the RNC that base station B is now part of the UE's active set. The RNC keeps its own active set record of the UE and therefore updates the active set record for that UE to include base station B. The UE is now able to communicate with base station B.

After the RNC receives Active Set Update Complete message 112 from the UE, the RNC begins to process UE Measurement Report 104, by transmitting a Setup Request message 114 to base station C. Similar to the responses to Measurement Report 102, base station C sends a setup response message 116 to the RNC. The RNC then sends an Active Set Update message 118 to the UE, which in turn updates its active set and transmits an Active Set Update message 120 to the RNC, thereby completing the processing of UE Measurement Report message 104, viz., adding base station C to the UE's active set. The time delay between the time that the second UE Measurement Report 104 is received by the RNC and the time that actual processing of this message begins (after message 112 is received by the RNC) can be so long that the UE misses the pilot signal associated with the second UE Measurement Report which could result in a dropped call.

Thus, in conventional systems, many times dropped calls occur (even when a strong pilot signal is present and has been detected) because of the delay caused by serial signal processing of UE Measurement Reports by the RNC. There is a need, therefore, for more efficient processing of messages associated with soft handoffs in wireless communication systems.

SUMMARY OF THE INVENTION

The method of the present invention provides a technique for processing messages received from user equipment in a communication system. Messages received from a UE may be converted into actions that can be put into a parallel processing pipeline. The actions may be executed so as to not conflict with each other. A conflict table of all current actions in the pipeline may be generated to determine actions that conflict with each other; such actions may be put in a pending state until there may no longer be any conflict. The method of the present invention thus processes a certain defined number of messages in parallel and generates one or more response messages derived from or based on the result of the executed or processed actions.

One exemplary embodiment of the present invention is the parallel processing of more than one message from a UE during soft handoff. Messages received from the UE are stored in a buffer for a defined time period. As messages arrive during the defined time period, the latest message is stored in the buffer and thus replaces any previous message stored in the buffer. When the defined time period expires, the latest message stored in the buffer is converted into "soft handoff actions" which are inserted into a parallel processing pipeline that executes the soft handoff actions along with other soft handoff actions for the same or other UE. The method of the present invention generates a conflict table that documents the particular actions being executed in the pipeline and identifies any conflicting soft handoff actions. Conflicting soft handoff actions are put into a pending state until the conflict is resolved or no longer exists. The method of the present invention uses a parallel pipeline to process the soft handoff actions until a certain defined number of soft handoff actions has been completed. The method of the present invention then generates a response message for one or more messages transmitted by the UE. In this manner, the latest message from a UE can be processed in parallel with other messages from the UE or other UEs thereby substantially reducing the amount of processing time for messages from the UE resulting in a more efficient soft handoff procedure.

DETAILED DESCRIPTION

The method of the present invention provides a technique for processing messages received from user equipment in a communication system. Messages received from a UE are converted into actions that are put into a parallel processing pipeline. The actions are executed so as to not conflict with each other. A conflict table of all current actions in the pipeline is generated to determine actions that conflict with each other; such actions are put in a pending state until there is no longer any conflict. The method of the present invention thus processes a certain defined number of messages in parallel and generates one or more response messages derived from or based on the result of the executed or processed actions.

One exemplary embodiment of the present invention is the parallel processing of more than one message from a UE during soft handoff. Messages received from the UE are stored in a buffer for a defined time period. As messages arrive during the defined time period, the latest message is stored in the buffer and thus replaces any previous message stored in the buffer. When the defined time period expires, the latest message stored in the buffer is converted into "soft handoff actions" which are inserted into a parallel processing pipeline that executes the soft handoff actions along with other soft handoff actions for the same or other UE. The method of the present invention generates a conflict table that documents the particular actions being executed in the pipeline and identifies any conflicting soft handoff actions. Conflicting soft handoff actions are put into a pending state until the conflict is resolved or no longer exists. The method of the present invention uses a parallel pipeline to process the soft handoff actions until a certain defined number of soft handoff actions has been completed. The method of the present invention then generates a response message for one or more messages transmitted by the UE. In this manner, the latest message from a UE can be processed in parallel with other messages from the UE or other UEs thereby substantially reducing the amount of processing time for messages from the UE resulting in a more efficient soft handoff procedure.

The method of the present invention will be discussed in the context of a UE in soft handoff in a CDMA wireless communication system. It should be noted, however, that the method of the present invention is not at all limited to processing messages from a UE during handoff. The method of the present invention generally applies to circumstances in which messages from a UE are processed by system equipment of a wireless or wireline communication system.

Figure 1:
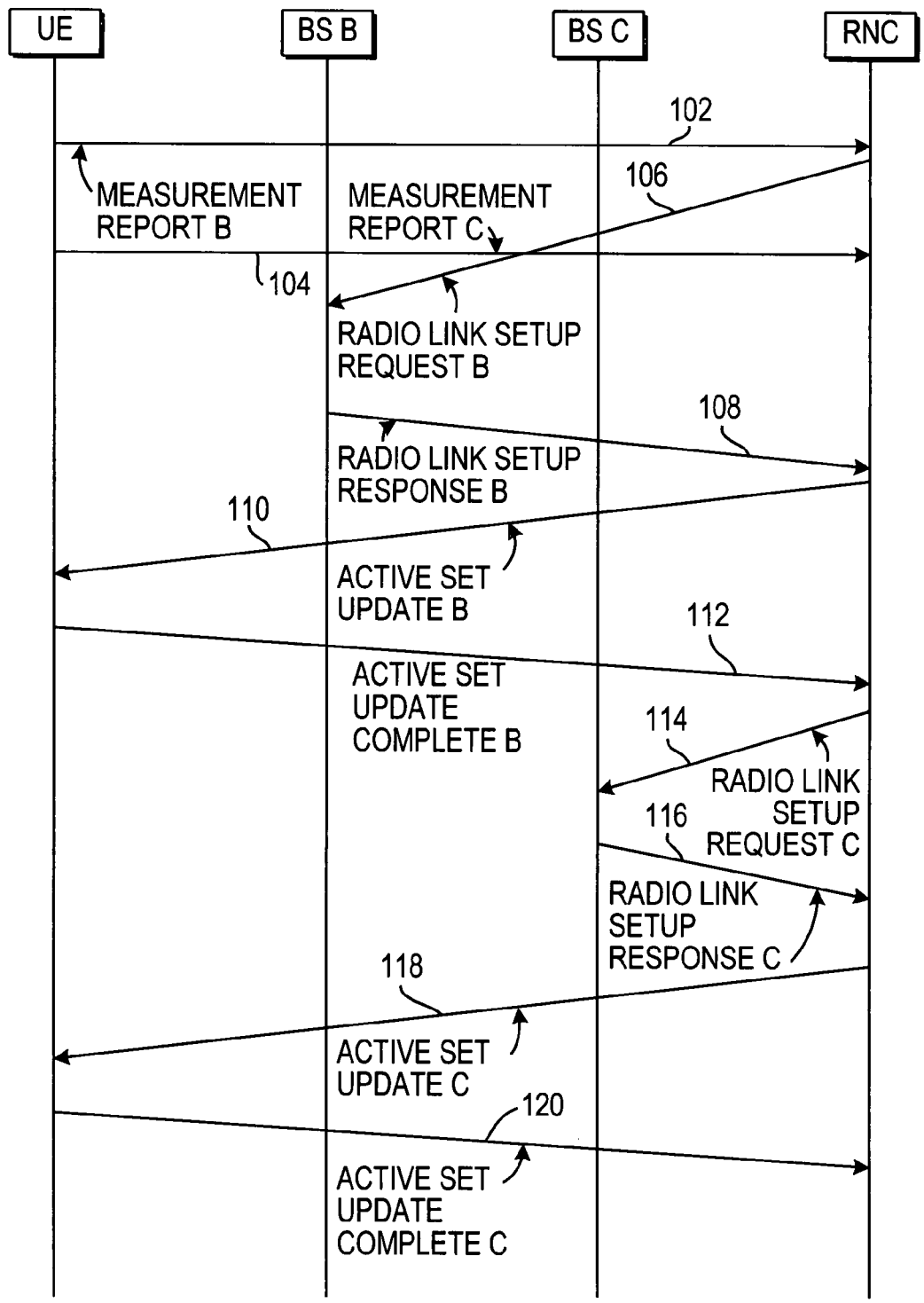
FIG. 1 depicts a timing diagram showing the exchange of messages between a UE and system equipment during a handoff.
Figure 2:
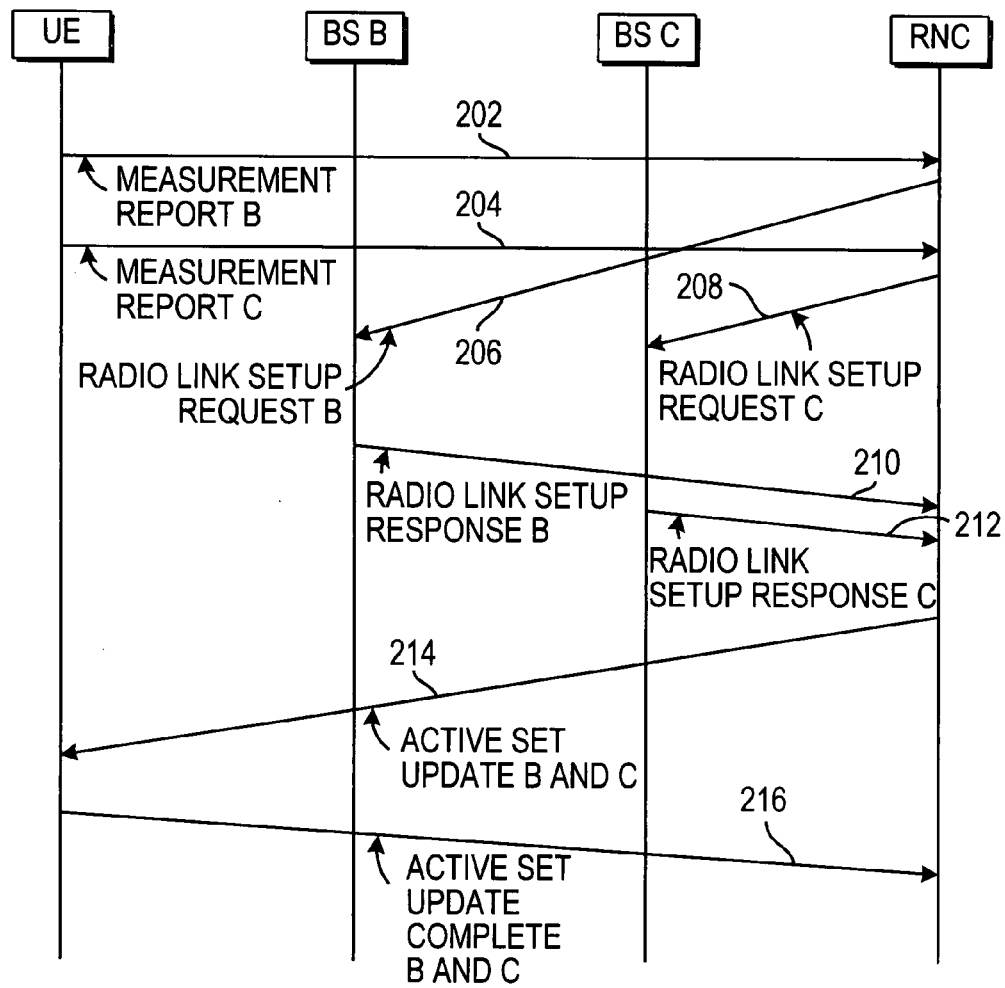
FIG. 2 depicts a timing diagram showing the exchange of messages between a UE and system equipment in accordance with the method of the present invention.

Referring to FIG. 2, there is shown a timing diagram for a UE requesting the RNC to add two legs to the UE's active set, viz., a communication link between the UE and a base station B and a communication link between the UE and a base station C. The UE transmits UE Measurement Report 202 to the RNC. Some time later, the UE transmits UE Measurement Report 204 the RNC. The UE Measurement Report 202 contains the pilot strength for base station B and also contains a request to the RNC to add base station B to the active set of the UE. The UE Measurement Report 204 contains the pilot strength for base station C and also contains a request to the RNC to add base station C to the active set of the UE. Unlike in the prior art, the RNC responds to the reception of each UE Measurement Report as the reports arrive. In particular, the RNC transmits Radio Link Setup request message 206 in response to the first Measurement Report (i.e., Measurement Report B) and the RNC transmits Radio Link Setup request message 208 in response to the second Measurement Report (i.e., Measurement Report C). Base stations B and C respond with respective Radio Link Setup messages 210 and 212 respectively. Suppose that the UE has requested that both base station B and C be added to its active set. The requests from the UE are processed by the RNC along with any other previous requests from the UE and/or other UEs in accordance with the method of the present invention.

Figure 3:
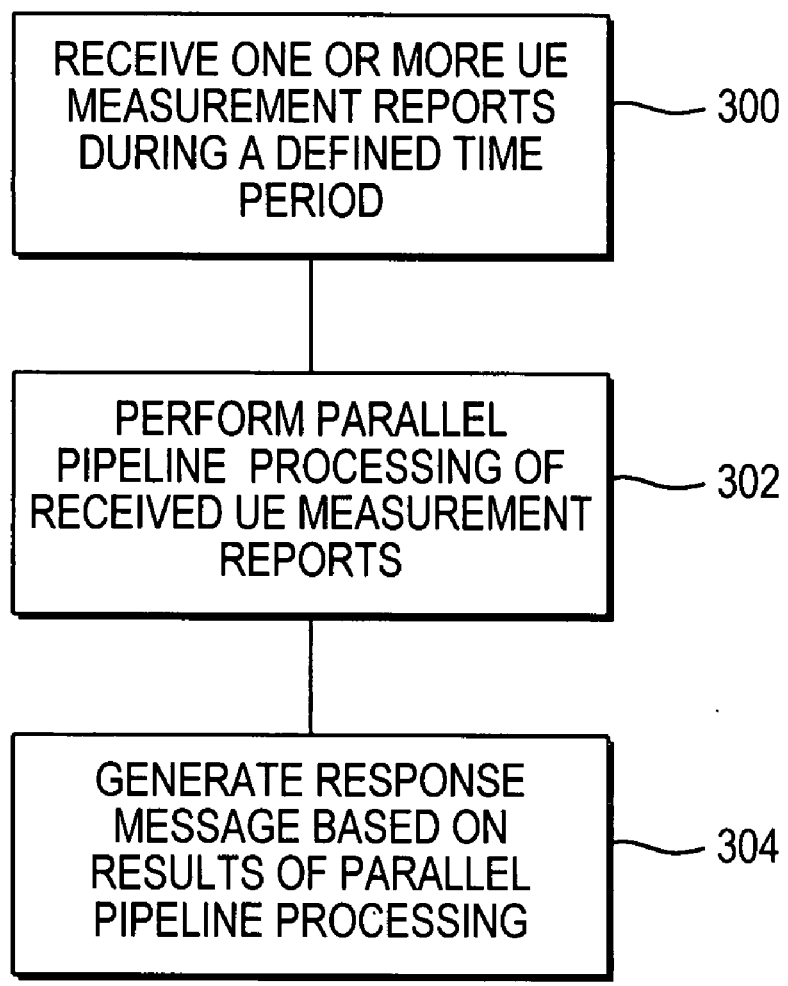
FIG. 3 depicts a flowchart of the method of the present invention.

Referring now to FIG. 3, the method of the present invention is shown in a flow chart where step 300 is first performed. In step 300, the RNC receives one or more UE Measurement Reports from the UE as explained above. When the RNC receives a UE Measurement Report, the RNC starts a timer called T_buffer. T_buffer is a time period that can equal to 0 or more seconds. The received Measurement Report is stored in a message buffer. The timer, T_buffer, is a defined time period (on the order of tens of milliseconds for CDMA systems) during which the RNC is waiting to receive Measurement Reports. If before the timer expires, another UE Measurement Report is received by the RNC, this message replaces the previous Measurement report stored in the message buffer. When the timer expires, the message buffer thus contains the latest UE Measurement Report received by the RNC. It should be noted that the timer can be disabled by setting the value of the timer to zero; in such a case the RNC will process a UE Measurement Report as soon as that message arrives. The latest UE Measurement Report stored in the message buffer upon the expiration of the timer is converted into one or more actions to be performed by the method of the present invention. For the particular scenario being discussed, the actions are called "soft handoff actions" or SOH.

Some specific soft handoff actions are the "Add action", the "Drop Action" and the "Swap Action." The "Add action" is the adding of a base station to the requesting UE's active set. The Add action involves establishing a communication link between the UE and the corresponding base station. The "Drop action" is the removal of a base station from a UE's active set. The "Drop action" involves "tearing down" or terminating an established communication link between the UE and the corresponding base station. The "Swap Action" is a combination of the Add and Drop actions, i.e., first dropping a leg and then adding another leg. For a Swap action, the add action is not be executed before the drop action is executed and completed.

In step 302, the soft handoff actions (more generally, the actions) are inserted into a parallel processing pipeline for execution. The parallel processing pipeline can be configured in any well known manner such as a plurality of processors connected in parallel to process the actions or a multiprocessor equipment that can be programmed to perform parallel processing of the different actions. The parallel processing of different action refers to the simultaneous processing of at least two actions by one or more processors. The parallel processing of different actions can also be the simultaneous processing of at least two actions by one processor programmed to perform such actions.

Each of the soft handoff actions can be in either one of four states during its execution. One state is called the "processing" or "executing" state representing a time period during which such action is being executed. Another state is called the "completed" state representing a point in time at which a soft handoff action has been completed. A third state is called the "suspended state" representing a time period during which execution of an action is temporarily suspended so as to perform another action whose execution facilitates the execution of the suspended action. A fourth state is called the "pending" state representing the time period during which a soft handoff action is not executed until a conflict between said action and another action is removed or no longer exists.

Because the actions are to be executed in parallel fashion, there is a possibility that certain actions to be executed for a particular UE will be in conflict with other actions for the same UE. When actions to be executed are in conflict or are incompatible to each other, these actions are set in the pending state and will not be executed until the conflicting action is completed or cancelled by subsequent new actions. Actions for a particular UE that are compatible to other actions for the UE are set to the executed state and are processed in the pipeline.

An action compatibility table is generated to keep track of the actions being executed in the parallel pipeline and the inter-relationships between such actions. The action compatibility table is a listing of the actions in the pipeline and their respective status. The status of an action is defined by the state of the action from which interrelationships between actions can be discerned. Thus, a number of actions are processed in the pipeline in parallel fashion taking into account the inter-relationship between the other actions.

The number of actions being executed in parallel in the pipeline at any particular time is limited by N_pipeline which is an integer equal to 1 or greater. The value for N_pipeline can be arbitrarily established by the operator and/or owner of a communication system. The method of the present invention is designed such that the number of soft handoff actions (or in general, number of actions) in the pipeline do not exceed N_pipeline. If the current number of soft handoff actions in the pipeline is less than N_pipeline and a new message (e.g., UE measurement report) arrives, that message is put in the message buffer and is then converted into soft handoff actions and then such actions are inserted in the parallel pipeline. If, however, the number of actions in the pipeline is equal to N_pipeline when a new message arrives, that message is put into the message buffer and is not processed until at least one of the soft handoff actions current being executed has been completed. In sum, the number of messages in the pipeline at any instant of time may not exceed the value for N_pipeline.

Table 1 shown below illustrates an example of an action compatibility table for a particular UE at time T and at time T+1. Times T and T+1 represent two different instants of time separated by a particular time unit that can be, for example, milliseconds or tens of milliseconds. It should be noted that the actions at time T and time T+1 are actions to be performed for one particular UE and not for different UEs; actions performed for different UE's are not in conflict with each other.

| Time = T Soft Handoff Action currently Processing (Setup/Teardown Commands already sent to Node B) | Time = T + 1 Pending Soft Handoff Actions in the Pipeline | Compatibility |
| --- | --- | --- |
| Adding Leg B | Dropping Leg B | Conflict |
| Adding Leg B | Adding Leg C | Compatible |
| Adding Leg B | Dropping Leg C (Leg C in active set) | Compatible* |
| Dropping Leg C (Leg C is in current active Set) | Adding Leg B | Compatible |

-continued

| Time = T Soft Handoff Action currently Processing (Setup/Teardown Commands already sent to Node B) | Time = T + 1 Pending Soft Handoff Actions in the Pipeline | Compatibility |
| --- | --- | --- |
| Dropping Leg C (Leg C is in current active Set) | Adding Leg C | Compatible** |

*The action of dropping Leg C is not executed in the pipeline, it is just marked and it is executed when the RNC receives ACTIVE SET UPDATE COMPLETE from the UE confirming the deletion of Leg C.
**The action of dropping Leg C is initially marked but later on cancelled by the new action of adding Leg C; that is the two actions cancel each other resulting in their removal from the pipeline. It should be noted that "adding a leg" or "dropping a leg" or "swapping a leg" refer to adding, dropping or swapping the communication links between the UE and a particular base station.

It should also be noted that the drop action is not an immediate tearing down of an existing leg as discussed with respect to the table above. If the drop action inserted in the pipeline involves an existing leg in the active set, it does not require immediate tear down of a leg between a UE and a base station (e.g., tearing down leg C in the example above). The drop action is marked as a "suspended state." A suspended drop action is executed when the UE has transmitted the ACTIVE SET UPDATE COMPLETE message acknowledging the dropping of the leg. The drop action can be put in a "pending state" if it is in conflict with other actions. A pending drop action means that the action will be executed in the pipeline after the conflicting action is completed. The drop action can also be used to cancel out "pending actions" in the pipeline. In addition to processing actions in parallel and suspending actions that conflict with each other, the method of the present invention can categorize actions into types of actions and prioritize such actions based on any type of algorithm devised by the system operator. In particular, drop actions can represent one type of action and add actions can represent another type of action. If two add actions are to be processed in parallel, the method of the present invention can prioritize one add action over another add action based on one or several parameters. For example, a first add action may be given a higher priority than a second priority if the first add action was inserted in the pipeline before the second action. Another technique may be that the first action is given priority over the second action if the message from which the first action was derived arrived before the message from which the second action was derived. A higher priority action is moved to the head of the pipeline where it is ready for processing. Thus, the pipeline of active actions (i.e., non-suspended or non-stalled actions) can be maintained in descending order of priorities with the higher priority actions being processed before the lower priority actions.

The following scenario helps illustrate step 302 of the method of the present invention. Suppose N_pipeline=4 and the current active set for a UE is (A1, A2) meaning that base stations A1 and A2 are in the UE's active set. Let the first Measurement Report message be (a) (A1, A2, B) meaning a request to add leg B. Let the second Measurement Report message be (b) (A1, A2) meaning a request to drop leg B. Let the third Measurement Report message be (c) (A1, A2, B, C) meaning a request to add legs B and C. The three messages are converted into soft handoff actions, (a), (b) and (c) and such soft handoff actions are inserted into the parallel pipeline processing. The soft handoff actions are as follows: (a) add Leg B; (b) drop Leg B; (c) add Leg C and (d) add Leg B. Soft handoff action (a) is inserted into the pipeline first and gets executed. Soft handoff action (b) then gets inserted into the pipeline, but is in conflict with soft handoff action (a). Hence soft handoff action (b) is stalled (put in suspended state). Soft handoff actions (c) and (d) are then inserted. Soft handoff action (c) is compatible with the processed action (i.e., soft handoff action (a)) and therefore is processed immediately. Soft handoff action (d) cancels the stalled action (b) and therefore, both actions are removed from the pipeline. As a result, the pipeline has two processing actions, viz., soft handoff actions (a) and (c).

When any of the soft handoff actions in the pipeline is in the completed state or in the suspended state, the RNC checks the status of the pipeline to see if there are any pending or stalled soft handoff actions. If there are pending actions in the pipeline, the method of the present invention waits for a period of time defined as T_assemble before moving on to step 304. T_assemble is a time period that can equal to 0 or more seconds. In step 304 the response message (ACTIVE SET UPDATE message 214) is generated based on the parallel processing of the soft handoff actions; that is, the response message is derived from the parallel processing of soft handoff actions. Otherwise the RNC assembles the response message immediately. In assembling the response message the method of the present invention includes all of the completed soft handoff actions as well as any suspended actions in such message. The response message is then transmitted by the RNC. In response to the response message, the UE receiving the message transmits back to the RNC ACTIVE SET UPDATE COMPLETE B AND C message 216 confirming that the authorizations contained in response message have been executed by the UE.

We claim:

1. A method of conveying information to at least one user equipment (UE) in a wireless communication system, the method comprising the steps of:
   receiving a message from a UE;
   storing the received message for a defined period of time;
   converting the received message into one or more actions;
   prioritizing the one or more actions according to their type;
   processing at least two actions using a parallel pipeline processing;
   generating a response message based on the parallel processing of the at least two actions; and
   transmitting the generated response message.

2. The method of claim 1, wherein the UE is in handoff.

3. The method of claim 1, wherein the received message is stored for a time period of T_buffer that is equal to or greater than 0 seconds.

4. The method of claim 1, wherein N_pipeline or less actions are processed using the parallel pipeline processing, where N_pipeline is an integer equal to 1 or greater.

5. The method of claim 1, comprising
   generating an action compatibility table to determine whether actions associated with the UE are in conflict.

6. The method of claim 5, wherein actions determined to be in conflict are not processed and are put in a pending state.

7. The method of claim 1, wherein the wireless communication system is a CDMA system in which a radio network controller processes the received messages which comprise UE measurement reports that are converted into soft handoff actions comprising an add action, a drop action and a swap action where each one of such actions can have one of a plurality of states comprising an executing state, a completed state, a pending state and a suspended state where the UE is in soft handoff with one or more base stations of the CDMA system and the transmitted response message is an active set update message.

8. A method of wireless communication, comprising the steps of:
   receiving a plurality of messages;
   determining whether actions corresponding to the plurality of messages conflict;
   processing any of the actions that do not conflict using parallel processing; and
   generating a response message based upon the processed actions.

9. The method of claim 8, comprising
   establishing a compatibility table that indicates whether any of the actions conflict.

10. The method of claim 8, wherein the plurality of messages comprise at least two messages from a single user equipment device and comprising
    determining whether the actions corresponding to the at least two messages conflict for the single user equipment device.

11. The method of claim 10, comprising
    determining whether any of the corresponding actions conflict for each of a plurality of user equipment devices.

12. The method of claim 8, comprising
    putting any conflicting actions in a pending state.

13. The method of claim 8, comprising
    assigning a priority to the corresponding actions; and
    performing the actions having a higher priority before performing actions having a lower priority.

14. The method of claim 13, comprising
    selecting one of two actions that conflict to perform; and
    selecting the one of the actions that has a higher priority relative to the other of the two actions.

15. The method of claim 8, comprising transmitting the generated response message.

16. The method of claim 8, wherein the received messages are from a user equipment device that is in handoff.

17. A method of wireless communication, comprising
    transmitting a plurality of messages from a user equipment device; and
    receiving a response message at the user equipment device, the response message being generated as a result of determining whether actions corresponding to the plurality of messages conflict and processing any of the actions that do not conflict using parallel processing.

18. The method of claim 17, comprising
    transmitting the messages from the user equipment device in handoff; and
    receiving the response message at the user equipment device in handoff.

* * * * *